United States Patent
Nam et al.

(10) Patent No.: US 9,163,998 B2
(45) Date of Patent: Oct. 20, 2015

(54) INFRARED DETECTOR

(71) Applicant: Samsung Electronics Co., Ltd., Suwon-Si, Gyeonggi-Do (KR)

(72) Inventors: Sung-hyun Nam, Yongin-si (KR); Hae-seok Park, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/146,820

(22) Filed: Jan. 3, 2014

(65) Prior Publication Data

US 2014/0217289 A1  Aug. 7, 2014

(30) Foreign Application Priority Data

Feb. 1, 2013  (KR) .................. 10-2013-0011979

(51) Int. Cl.
*G01J 5/20* (2006.01)
*G01J 5/08* (2006.01)
*G01J 5/02* (2006.01)

(52) U.S. Cl.
CPC .. *G01J 5/20* (2013.01); *G01J 5/023* (2013.01); *G01J 5/0818* (2013.01); *G01J 5/0853* (2013.01)

(58) Field of Classification Search
CPC .............................. G01N 21/3563; G01J 5/20
USPC ..................................................... 250/339.01
See application file for complete search history.

(56) References Cited

U.S. PATENT DOCUMENTS

| 6,621,083 B2 | 9/2003 | Cole |
| 2006/0000974 A1 | 1/2006 | Brouns |
| 2006/0175551 A1 | 8/2006 | Fan et al. |
| 2009/0284404 A1 | 11/2009 | Sim et al. |
| 2014/0226021 A1* | 8/2014 | Koechlin et al. .............. 348/165 |

FOREIGN PATENT DOCUMENTS

| EP | 2581721 A2 | 4/2013 |
| FR | 2977937 A1 | 1/2013 |
| JP | 2009539085 A | 11/2009 |
| WO | WO-2011050165 A2 | 4/2011 |

OTHER PUBLICATIONS

Tao, et al., A Dual Band Terahertz Metamaterial Absorber, J. Phys. D: Appl. Phys. 43 (2010) 225102 (5pp).
Landy, et al., Perfect Metamaterial Absorber, PRL 100, 207402 (2008), The American Physical Society.
Maier T. et al., "Wavelength-tunable microbolometers with metamaterial absorbers", Optics Letters, Optical Society of America, US, vol. 34, No. 19, Oct. 1, 1999, pp. 3012-3014, XP001548614.
European Search Report dated Apr. 24, 2014 issued in corresponding European Application No. 14152179.9.

* cited by examiner

*Primary Examiner* — David Porta
*Assistant Examiner* — Hugh H Maupin
(74) *Attorney, Agent, or Firm* — Harness, Dickey & Pierce, P.L.C.

(57) ABSTRACT

An infrared detector may include a substrate, a resonant unit spaced apart from the substrate, the resonant unit configured to generate heat by inducing resonance at a plurality of wavelengths of incident infrared light, a thermistor layer configured to support the resonant unit and be spaced apart from the resonant unit, the thermistor layer having a resistance value that varies according to the heat generated in the resonant unit, and a connection unit configured to support the thermistor layer such that the thermistor layer is spaced apart from the substrate and electrically connect the thermistor layer to the substrate.

24 Claims, 8 Drawing Sheets

INFRARED DETECTOR

CROSS-REFERENCE TO RELATED APPLICATIONS

This application claims the benefit of Korean Patent Application No. 10-2013-0011979, filed on Feb. 1, 2013, in the Korean Intellectual Property Office, the disclosure of which is incorporated herein in its entirety by reference.

BACKGROUND

1. Field

Example embodiments relate to infrared detectors, and more particularly, to infrared detectors configured to absorb broadband infrared light.

2. Description of the Related Art

According to the black body radiation theory, an object radiates a broadband electromagnetic wave, the intensity of the radiation being maximized at a specific wavelength that varies depending on a temperature of the object. For example, an object at room temperature radiates infrared light whose intensity is maximized at a wavelength of about 10 μm.

A bolometer is a device for measuring radiant energy by using the black body radiant theory. The bolometer absorbs an electromagnetic wave having a wavelength of radiated infrared light (or terahertz) and measures the radiant energy by converting the electromagnetic wave to heat and detecting a temperature change due to the heat.

Recently, with the development of microelectromechanical system (MEMS) technology, infrared detectors having a two-dimensional array of a plurality of microbolometers have been developed. Such infrared detectors may be used in, for example, a thermal imaging camera for obtaining thermo images. In order to manufacture a thermal imaging camera having high resolution and high temperature accuracy, it may be desirable to reduce a size of a pixel. However, when the infrared detector uses a bolometer having a Salisbury screen structure, in which a ground plate is spaced apart from a thermal absorber by a distance of $\lambda/4$ (where, $\lambda$ is a center wavelength of a wavelength band of infrared light to be detected), if a size of a screen within a pixel is reduced, incident energy on each pixel may decrease. By decreasing the incident energy provided to each pixel, an amount of temperature change may decrease and a signal-to-noise ratio may also decrease.

Surface plasmon is a type of electromagnetic wave generated due to charge density oscillation occurring at a surface of metal rather than internally as in a Salisbury screen. A bolometer utilizing a localized surface plasmon resonance (LSPR) phenomenon instead of the Salisbury screen structure has been recently proposed. A bolometer using a plasmonic absorber may overcome the limitations of the low absorbing rate and the low signal-to-noise ratio because of the LSPR.

However, since the plasmonic absorber has a relatively narrow bandwidth, it is difficult to obtain thermo images. Therefore, various methods of increasing a resonance bandwidth of the plasmonic absorber are proposed.

SUMMARY

One or more example embodiments relate to infrared detectors configured to absorb infrared light using a plasmon resonance phenomenon.

In one or more example embodiments, the infrared detectors have a high absorption ratio for a broadband wavelength.

Additional aspects will be set forth in part in the description which follows and, in part, will be apparent from the description, or may be learned by practice of the presented example embodiments.

According to an example embodiment, an infrared detector includes a substrate; a resonant unit spaced apart from the substrate to generate heat by inducing resonance at a plurality of wavelengths of incident infrared light; a thermistor layer supporting the resonant unit and having a resistance value that changes according to the heat generated in the resonant unit; and a connection unit supporting the thermistor layer so that the thermistor layer is spaced apart from the substrate and electrically connecting the thermistor layer to the substrate.

The resonant unit includes: a first resonator absorbing infrared light of a first wavelength band; and a second resonator absorbing infrared light of a second wavelength band.

At least one of the first and second resonators includes: a first sub-resonator absorbing first polarized light; and a second sub-resonator absorbing second polarized light perpendicular to the first polarized light.

At least one of the first and second sub-resonators may have a shape of a rod.

The first and second sub-resonators may be spaced apart from each other or may share a region.

The first sub-resonator of the first resonator and the second sub-resonator of the second resonator may share a region.

The first and second resonators may be spaced apart from each other or share a region.

The first wavelength band and the second wavelength band partially may overlap with each other or may be completely different from each other.

The connection unit may include: a support protruding from the substrate so that the thermistor layer is spaced apart from the substrate; and a thermal leg connecting the thermistor layer to the support.

The thermal leg may include a meander pattern.

The infrared detector may further include a metal pad disposed between the support and the substrate to electrically connect the support to the substrate.

The infrared detector may further include a reflective layer disposed between the substrate and the thermistor layer to reflect incident infrared light.

The reflective layer may contact the substrate.

The reflective layer may be formed of metal material and formed of material absorbing less heat than that of the resonator.

The infrared detector may further include a thermal separation layer disposed between the substrate and the thermistor layer to block heat transfer from the thermistor layer to the substrate.

According to another example embodiment, an infrared detector includes a substrate; a plurality of resonant units spaced apart from the substrate to generate heat by inducing resonance at a plurality of resonant wavelengths and absorb infrared light; a plurality of thermistor layers respectively supporting the resonant units and having resistance values varying with temperature changes in the resonant units; and a connection unit supporting the thermistor layers so that the thermistor layers are spaced apart from the substrate and electrically connecting the thermistor layers to the substrate.

The connection unit may include: a plurality of supports protruding from the substrate so that the thermistor layers are spaced apart from the substrate; and a plurality of thermal legs connecting the thermistor layers to the supports.

The thermal legs may be connected in series.

Each of the resonant units may include: a first resonator absorbing infrared light of a first wavelength band; and a second resonator absorbing infrared light of a second wavelength band different from the first wavelength band.

At least one of the first and second resonators may include: a first sub-resonator absorbing first polarized light; and a second sub-resonator absorbing second polarized light perpendicular to the first polarized light.

In one example embodiment, the infrared detector includes a thermistor having a resistance value that varies according to temperature; and a resonator disposed above the thermistor at a distance, the resonator configured to generate heat in response to electromagnetic radiation within at least two distinct wavelength bands.

In one embodiment, the resonator is configured to generate heat in response to electromagnetic radiation within a first wavelength band and a second wavelength band, the second wavelength band including wavelengths outside of the first wavelength band.

In one embodiment, the resonator has at least two discrete resonant frequencies.

In one embodiment, the resonator includes a plurality of sub-resonators, each sub-resonator having one of the discrete resonant frequencies.

In one embodiment, the wavelengths of the first and second wavelength bands both include wavelengths of infrared light.

In one embodiment, the infrared detector further includes a support configured to suspend the thermistor at a location above a substrate of the infrared detector having a driving circuit thereon; and a thermal separation layer configured to impede heat transfer from the thermistor to the substrate.

In one embodiment, the two distinct wavelength bands are wavelength bands that partially overlap each other.

In one embodiment, the two distinct wavelength bands are wavelength bands that do not overlap each other.

In one embodiment, a thermal imaging camera includes a plurality of the infrared detectors configured to generate thermo images by absorbing infrared light between at least 8 nanometers and 14 nanometers.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
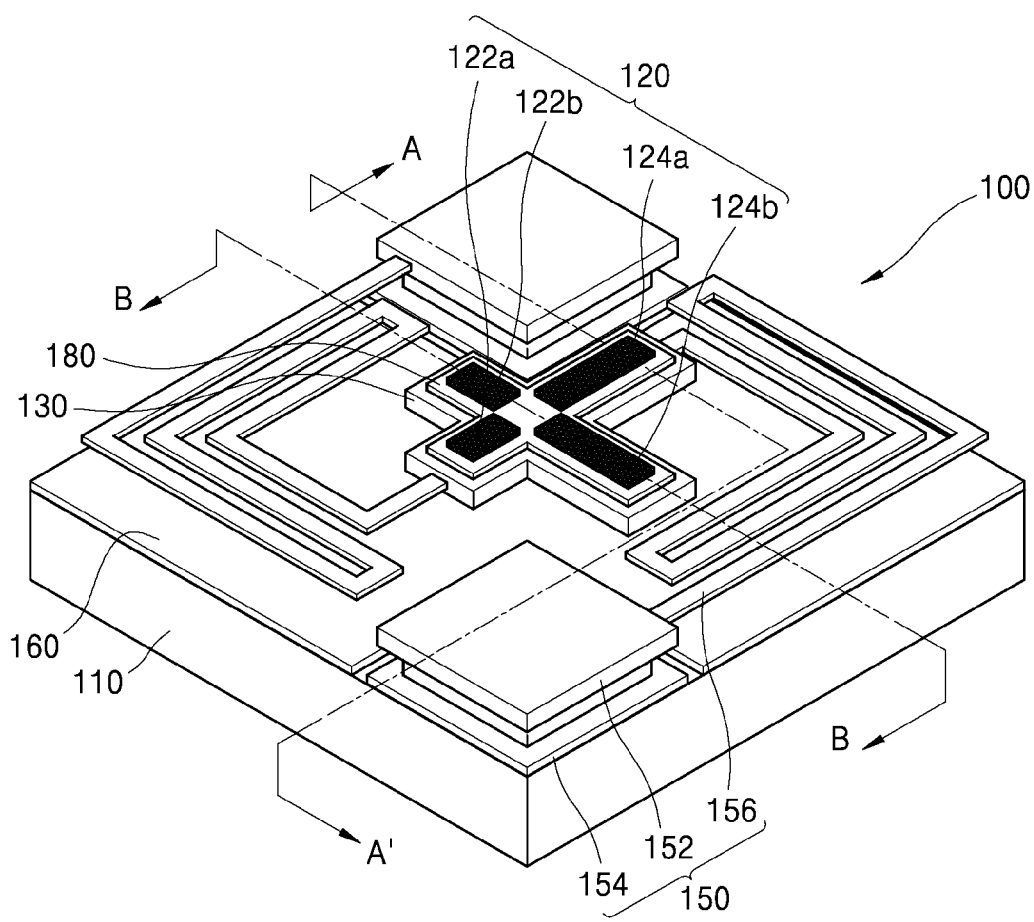
FIG. 1 is a perspective view illustrating a structure of an infrared detector according to an example embodiment.

Reference will now be made in detail to example embodiments, examples of which are illustrated in the accompanying drawings, wherein like reference numerals refer to like elements throughout and sizes of elements may be exaggerated for clarity. In this regard, the present example embodiments may have different forms and should not be construed as being limited to the descriptions set forth herein. Accordingly, the embodiments are merely described below, by referring to the figures, to explain aspects of the present description.

Detailed illustrative embodiments are disclosed herein. However, specific structural and functional details disclosed herein are merely representative for purposes of describing example embodiments. Example embodiments may be embodied in many alternate forms and should not be construed as limited to only those set forth herein.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Hereinafter, an infrared detector will be described in detail with reference to the accompanying drawings.

Figure 2:
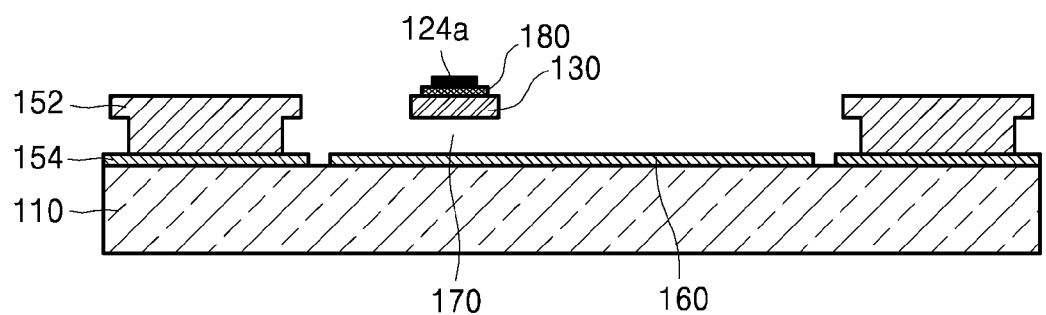
FIG. 2 is a cross-sectional view of the infrared detector taken along the line A-A' of FIG. 1.
Figure 3:
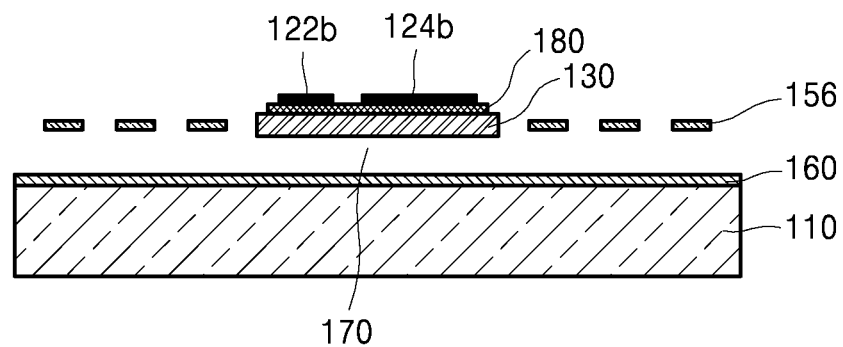
FIG. 3 is a cross-sectional view of the infrared detector taken along the line B-B' of FIG. 1.

FIG. 1 is a perspective view illustrating a structure of an infrared detector 100 according to an example embodiment, FIG. 2 is a cross-sectional view of the infrared detector 100 taken along the line A-A' of FIG. 1 and FIG. 3 is a cross-sectional view of the infrared detector 100 taken along the line B-B' of FIG. 1. The infrared detector 100 illustrated in FIGS. 1 to 3 may be a unit pixel.

Structure of the Infrared Detector

Referring to FIGS. 1 to 3, the infrared detector 100 includes a substrate 110; a resonant unit 120 that is spaced apart from the substrate 110 and plasmon-resonates at a plurality of wavelengths so as to absorb infrared light. The infrared detector 100 further includes a thermistor layer 130 and a connection unit 150. The thermistor layer 130 supports the resonant unit 120 and has a resistance value that changes according to a temperature change in the resonant unit 120. The connection unit 150 supports the thermistor layer 130 so that the thermistor layer 130 is spaced apart from the substrate 110 and electrically connects the thermistor layer 130 to the substrate 110.

Although not illustrated, a driving circuit for controlling the infrared detector 100 and reading the intensity of detected infrared light and various conductive metal wirings may be arranged on the substrate 110.

The resonant unit 120 may absorb infrared light due to a resonance phenomenon and generate heat. In particular, the resonant unit 120 may induce resonance at a plurality of wavelengths. The resonant unit 120 may include at least two resonators for absorbing infrared light of two different wavelength bands. The different wavelength bands may partially overlap with each other or may be completely different from each other. Each of the two wavelength bands may include at least one wavelength that is outside of the wavelength band of the other one of the two wavelength bands. A resonant wavelength of infrared light is determined according to the permittivity of materials of the resonant unit 120 and the thermistor layer 130, a shape and a size of the resonant unit 120, and a thickness of the thermistor layer 130.

Figure 4:
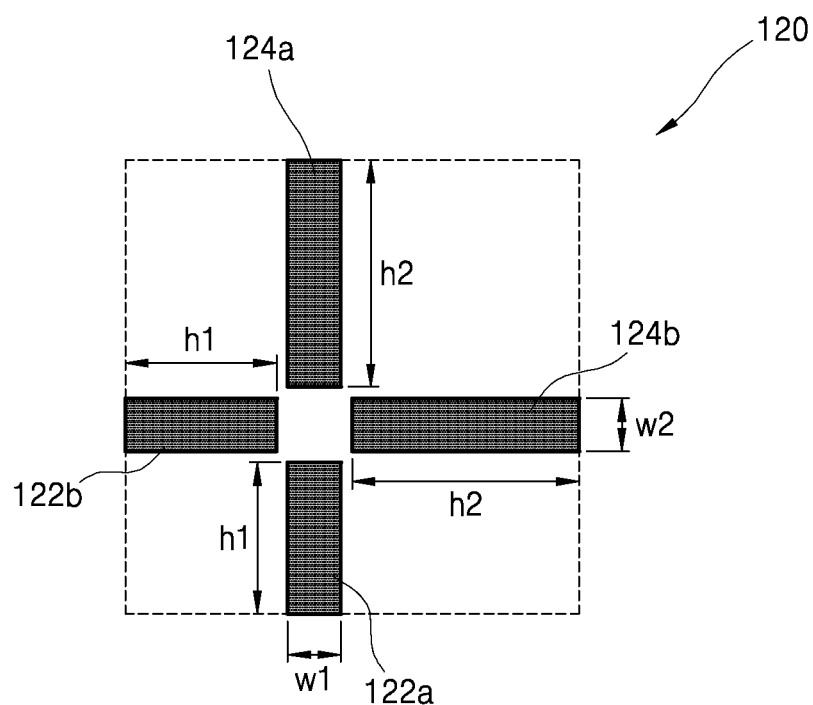
FIG. 4 is a planar view of a resonant unit included in the infrared detector of FIG. 1 according to an example embodiment.

For example, as illustrated in FIG. 4, the resonant unit 120 may include a first resonator 122 for absorbing infrared light of a first wavelength band and a second resonator 124 for absorbing infrared light of a second wavelength band. The first and second resonators 122 and 124 may respectively include first and third sub-resonators 122a and 124a for absorbing first polarized light and second and fourth sub-resonators 122b and 124b for absorbing second polarized light perpendicular to the first polarized light. The first polarized light may be vertically polarized light and the second polarized light may be horizontally polarized light. Therefore, the first resonator 122 may include the first sub-resonator 122a for absorbing vertically polarized light from the infrared light of the first wavelength band and the second sub-resonator 122b for absorbing horizontally polarized light from the infrared light of the first wavelength band, and the second resonator 124 may include the third resonator 124a for absorbing vertically polarized light from the infrared light of the second wavelength band and the fourth sub-resonator 124b for absorbing horizontally polarized light from the infrared light of the second wavelength band.

The first to fourth sub-resonators 122a, 122b, 124a, and 124b may have a shape of a rod. The first and second sub-resonators 122a and 122b may have the same size and may be spaced apart perpendicular to each other. The third and fourth sub-resonators 124a and 124b may have the same size and may be spaced apart perpendicular to each other. The sizes of the first and second sub-resonators 122a and 122b may be different from those of the third and fourth sub-resonators 124a and 124b.

Each of the first to fourth sub-resonators 122a, 122b, 124a, and 124b may be a plasmon absorber for absorbing infrared light through localized surface plasmon resonance or metamaterial for absorbing infrared light due to resonance of the metamaterial. Each of the first to fourth sub-resonators 122a, 122b, 124a, and 124b may be formed of material including metal. For example, the first to fourth sub-resonators 122a, 122b, 124a, and 124b may include at least one metal material selected from the group consisting of gold, titanium, aluminum, copper, platinum, silver, nickel (Ni), and chrome (Cr), or an alloy of metals. When infrared light interacts with the first to fourth sub-resonators 122a, 122b, 124a, and 124b through the localized surface plasmon resonance, light may be focused on a very narrow region.

The thermistor layer 130 may not only mechanically support the resonant unit 120 but may also receive heat generated in the resonant unit 120. The thermistor layer 130 may directly absorb a part of infrared light. As illustrated in FIGS. 1 and 4, the resonant unit 120 may be arranged on the thermistor layer 130, and the thermistor layer 130 may have a plate structure. An area of the thermistor layer 130 may be the same as or slightly greater than that of the resonant unit 120. In FIG. 1, the thermistor layer 130 has an area that is slightly larger than the resonant unit 120 and is formed in the shape of a plate with the resonant unit 120, but is not limited thereto.

The thermistor layer 130 may include a thermally variable resistor material whose resistance value changes according to a temperature. A temperature coefficient of resistance (TCR) of the thermally variable resistor material may be high. For example, the thermistor layer 130 may include thermally variable resistor materials such as vanadium oxide (VOx) and nickel oxide, or may be composed of a composite material from the thermally variable resistor material and other dielectrics, e.g. silicon nitride and silicon oxide.

The connection unit 150 supports the thermistor layer 130 so that the thermistor layer 130 is spaced apart from the substrate 110. Further, the connection unit 150 electrically connects the thermistor layer 130 to the substrate 110. The connection unit 150 may be formed of conductive material so as to electrically connect the thermistor layer 130 to the substrate 110. Accordingly, current flows between the thermistor layer 130 and the connection unit 150, and the driving circuit (not illustrated) in the substrate 110 may detect a resistance change caused by absorbed heat.

The connection unit 150 may include: a support 152, a metal pad 154 and a thermal leg 156. The support 152 may support the thermistor layer 130 and protrude from the substrate 110 so that the thermistor layer 130 is spaced apart from the substrate 110. The metal pad 154 may be arranged between the support 152 and the substrate 110 to electrically connect the driving circuit (not illustrated) in the substrate 110 to the support 152. The thermal leg 156 may connect the support 152 to the thermistor layer 130 and minimize heat transferred from the thermistor layer 130 to the support 152. The thermal leg 156 may be horizontally arranged with respect to the substrate 110 such that a first end portion of the thermal leg 156 may be connected to a side portion of the support 152 in the form of a cantilever.

In FIG. 1, each of the support 152, the metal pad 154, and the thermal leg 156 is provided in a pair, but is not limited thereto. The number of each of the support 152, the metal pad 154, and the thermal leg 156 may be two or more.

The support 152 may be spaced far apart from the resonant unit 120. For example, the support 152 may be arranged in a diagonal direction on the substrate 110 so as to vertically protrude from the substrate 110.

The inside of the support 152 may be or may be not filled with conductive material. In the case where the inside of the support 152 is filled with conductive material, the metal pad 154 may be not necessary. This is because the support 152 may sufficiently transfer electric signals to the driving circuit.

A second end portion of the thermal leg 156 may be connected to the thermistor layer 130. Therefore, the thermistor layer 130 may be supported and spaced apart from the substrate 110 by the thermal leg 156 and the support 152. A pair of the thermal legs 156 may be connected in series to both sides of the thermistor layer 130. The thermal leg 156 may include a meander pattern to prevent the heat of the resonant unit 120 from being transferred to the substrate 110. The thermal leg 156 may be formed of material including thermally variable resistor material, a dielectric, and a metal thin film.

A thermal separation layer 160 may be disposed between the substrate 110 and the thermistor 130. The thermal separation layer 160 minimizes direct heat transfer from the resonant unit 120 and the thermistor layer 130 to the substrate 110. The thermal separation unit 160 may include one of low heat conductive layers such as a vacuum layer and an air layer.

The infrared detector 100 may further include a reflective layer 170 disposed between the resonant unit 120 and the substrate 110 to reflect incident infrared light. In FIGS. 1 to 3, the reflective layer 170 is disposed between the thermal separation layer 160 and the substrate 110, but is not limited thereto. The reflective layer 170 may be disposed between the thermistor layer 130 and the thermal separation layer 160. The reflective layer 170 may reflect infrared light toward the resonant unit 120, and induce plasmon resonance with the resonant unit 120, thereby improving infrared light absorbing efficiency. The reflective layer 170 may have a certain thickness, e.g. about 300 nm to about 400 nm or more, so that incident infrared light hardly passes to the substrate 110. Accordingly, the substrate 110 under the reflective layer 170 may hardly affect the resonance phenomenon.

When plasmon resonance occurs in the resonant unit 120, the infrared light reflected from the reflective layer 170 induces destructive interference with the infrared light radiated from the resonant unit 120, thereby improving absorbing efficiency.

In the case where the thermal separation layer 160 is disposed between the reflective layer 170 and the thermistor layer 130, as illustrated in FIG. 2, the reflective layer 170 may be formed on the substrate 110. The reflective layer 170 may be formed of metal that allows heat generation due to infrared light absorption to be less intensive than that of the resonant unit 120. Accordingly, the heat generation is minimized in the reflective layer 170, and a magnitude of a signal may be improved. For example, the resonant unit 120 may include titanium, and the reflective layer 170 may include at least one of gold (Au) and aluminum. The signal is improved when the heat generated by the reflective layer 170 is reduced because the heat generated in the reflective layer 170 is not used to detect a signal and is thus a loss in the case where the reflective layer 170 is formed on the substrate 110, as illustrated in FIG. 2.

In another example embodiment, the reflective layer 170 may be disposed between the thermistor layer 130 and the thermal separation layer 160. In this case, the reflective layer 170 may include metal and may be contacted with the thermistor layer 130. In the case where the reflective layer 170 is contacted with the thermistor layer 130, the heat generated in the reflective layer 170 may be used to detect a signal. Therefore, the resonant unit 120 may include a different type of metal that generates more heat than that of the reflective layer 170, or may include the same type of metal as that of the reflective layer 170.

As illustrated in FIGS. 2 and 3, the infrared detector 100 may further include an insulating layer 180 disposed between the resonant unit 120 and the thermistor layer 130 to electrically insulate the resonant unit 120 from the thermistor layer 130. The insulating layer 180 may be formed of, for example, silicon oxide or silicon nitride.

Operation of the Infrared Detector

In one or more example embodiments, the infrared detector 100 may operate as described below.

When an electromagnetic wave of an infrared band (e.g. about 8-14 λm) is incident to the infrared detector 100, surface plasmon resonance or resonance of metamaterial occurs in the resonant unit 120 due to energy of the electromagnetic wave. The remaining electromagnetic wave not absorbed by the resonant unit 120 is reflected by the reflective unit 170 and then is incident to the resonant unit 120 again, and thus the absorbing efficiency may be improved.

The occurrence of resonance in the resonant unit 120 may generate heat, and thus a temperature of the thermistor layer 130 adjacent to the resonant unit 120 may increase. The change in temperature may change the resistance of the thermistor layer 130, which may change an amount of current flowing through the connection unit 150. Therefore, by measuring the current flowing through the connection unit 150 by using the driving circuit (not illustrated) in the substrate 110, the intensity of the infrared light incident to the infrared detector 100 may be measured.

According to an embodiment, the resonant unit 120 is designed so as to have a plurality of resonant wavelengths within an infrared band (e.g. about 8-14 λm) to be detected, and thus the resonant unit 120 may induce resonance in a plurality of resonance modes. The resonant unit 120 may include the first sub-resonator 122a for resonating in vertically polarized light among the infrared light of the first wavelength band, the second sub-resonator 122b for resonating in horizontally polarized light among the infrared light of the first wavelength band, the third resonator 124a for resonating in vertically polarized light among the infrared light of the second wavelength band, and the fourth sub-resonator 124b for resonating in horizontally polarized light among the infrared light of the second wavelength band. As described above, the resonant unit 120 is configured to have various resonant frequencies, and thus the infrared detector 100 may obtain constantly high detection characteristics at a broadband of infrared light.

Simulation of the Infrared Detector

Figure 5:
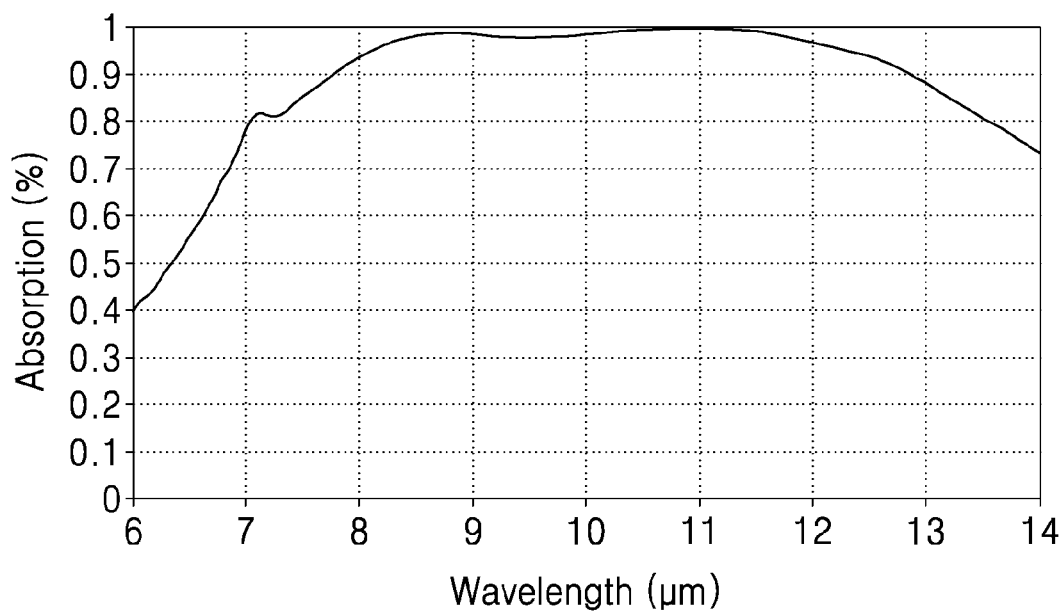
FIG. 5 is a graph illustrating a result of simulating an absorption spectrum of the resonator of the infrared detector of FIG. 1.

FIG. 5 is a graph illustrating a result of simulating an absorption spectrum of the resonator of the infrared detector 100 of FIG. 1.

The first resonator 122 may be designed to have a length of about 1.4 λm and a width of about 0.5 λm, and the second resonator 124 may be designed to have a length of about 2.2 λm and a width of about 0.5 λm. With such a configuration, as illustrated in FIG. 5, it may be understood that a wavelength band of an absorption spectrum in which an absorption ratio is about 90% or higher is about 8 λm to about 12 λm, which is generally wide. It may also be understood that an average absorption ratio is about 70% or higher.

As described above, the resonant unit 120 includes a plurality of resonators having a plurality of resonant frequencies. The arrangement form of the resonators illustrated in FIG. 1 is just an example and may be variously modified.

Resonator Arrangements

Figure 6A:
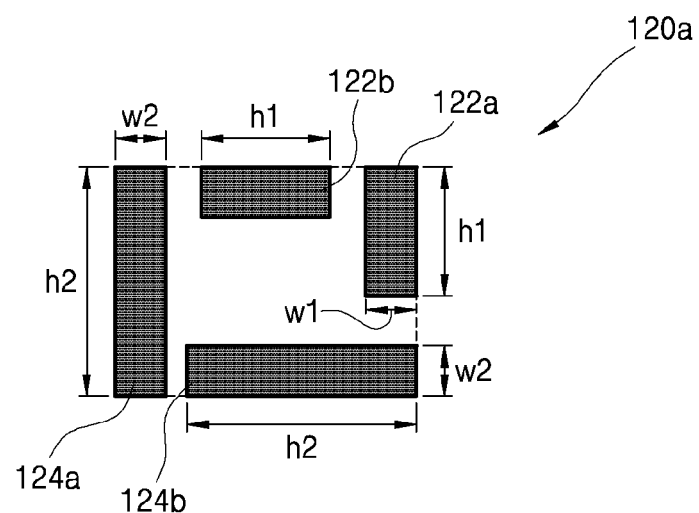
FIGS. 6A to 6C are diagrams exemplarily illustrating arrangement forms of resonators in a resonant unit.
Figure 6B:
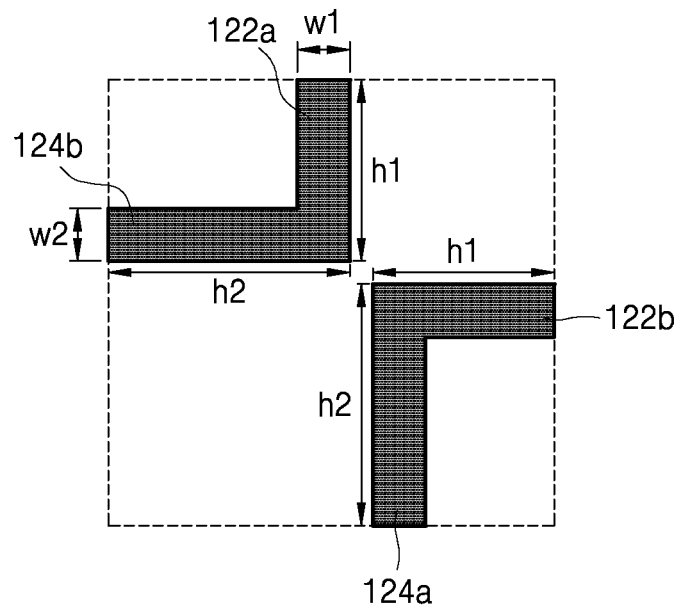
Figure 6C:
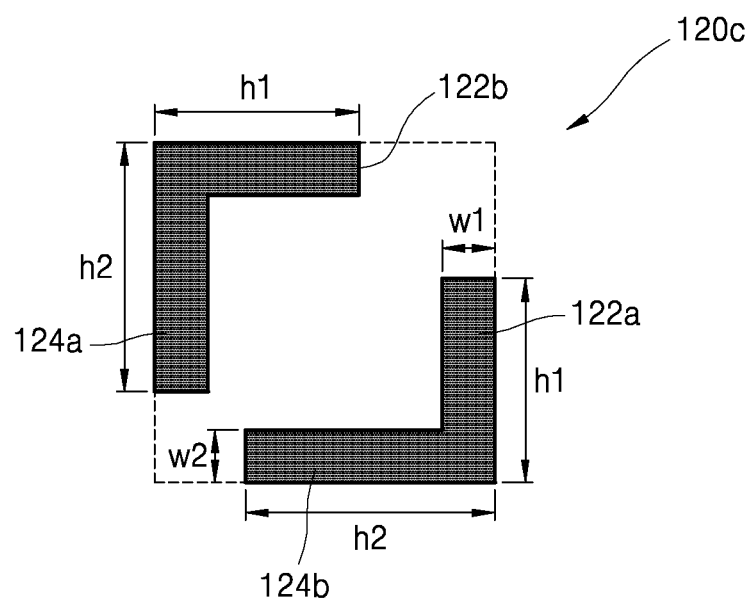

FIGS. 6A to 6C are diagrams exemplarily illustrating arrangement forms of resonators in a resonant unit.

As illustrated in FIG. 6A, first to fourth sub-resonators 122a, 122b, 124a, and 124b in a resonant unit 120a may be arranged to be spaced apart from each other and may generally form a quadrangle.

As illustrated in FIG. 6B, at least a part of the plurality of sub-resonators may share a certain region. For example, the first sub-resonator 122a and the fourth sub-resonator 124b may share a certain region, and the second sub-resonator 122b and the third sub-resonator 124a may share a certain region. Accordingly, a resonant unit 120b may generally have a shape of a cross.

Alternatively, as illustrated in FIG. 6C, the first sub-resonator 122a and the fourth sub-resonator 124b may be connected to each other, and the second sub-resonator 122b and the third sub-resonator 124a may be connected to each other. Accordingly, a resonant unit 120c may generally have a shape of a quadrangle.

In FIGS. 6B and 6C, an edge part of the first sub-resonator 122a is shared with an edge part of the fourth sub-resonator 124b, and an edge part of the second sub-resonator 122b is shared with an edge part of the third sub-resonator 124a, but the sub-resonators are not limited thereto. For example, the resonators may share center regions thereof.

The above-described vertical and horizontal arrangements of the resonators release polarization dependency of resonance, and thus resonance is induced for both the vertically polarized infrared light and the horizontally polarized infrared light. Further, since the plurality of sub-resonators that resonate at different wavelengths are arranged, an average absorption ratio of a wavelength band of interest may be increased.

Although it has been described that two sub-resonators having the same resonant frequency but having different polarization characteristics are spaced apart from each other, the sub-resonators are not limited thereto. For example, two sub-resonators having different polarization characteristics may share a region.

Figure 7A:
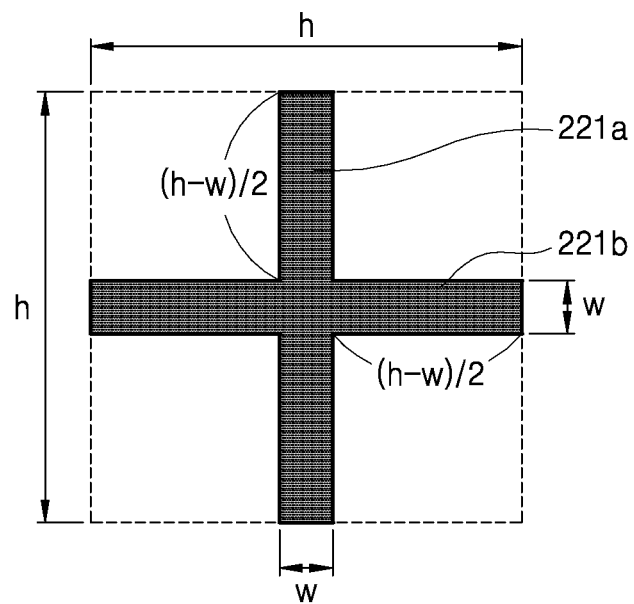
FIGS. 7A and 7B are diagrams illustrating other forms of a resonant unit according to an example embodiment.
Figure 7B:
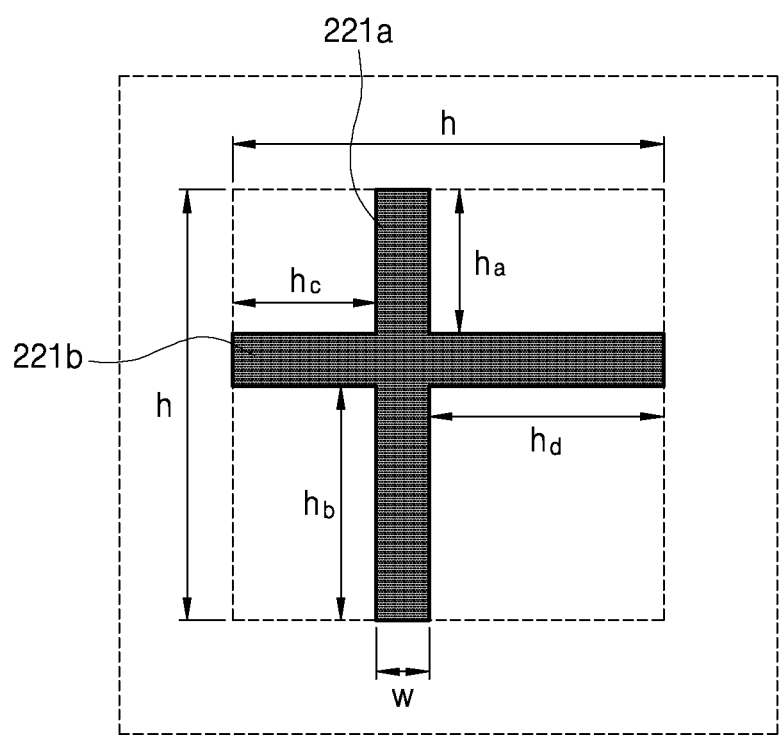

FIGS. 7A and 7B are diagrams illustrating other forms of a resonant unit according to an example embodiment.

As illustrated in FIG. 7A, two sub-resonators 221a and 221b having the same resonant wavelength but having different polarization characteristics are connected to each other so that a resonator may form a shape of a cross. That is, the two sub-resonators 221a and 221b may share a center region. However, in this case, since the two sub-resonators 221a and 221b have the same absorption wavelength band, an absorption bandwidth may thus become narrow.

Alternatively, rather than sharing a center region, as illustrated in FIG. 7B, the two sub-resonators 221a and 221b may be asymmetrically connected to each other. For example, ha<hb and hc<hd. Accordingly, the shared region of the resonator of FIG. 7B may be closer to one side, the resonator forming a shape of a cross. In this case, the resonator has one or more resonant frequencies due to the asymmetric shape, and thus the absorption bandwidth becomes wider.

Figure 8:
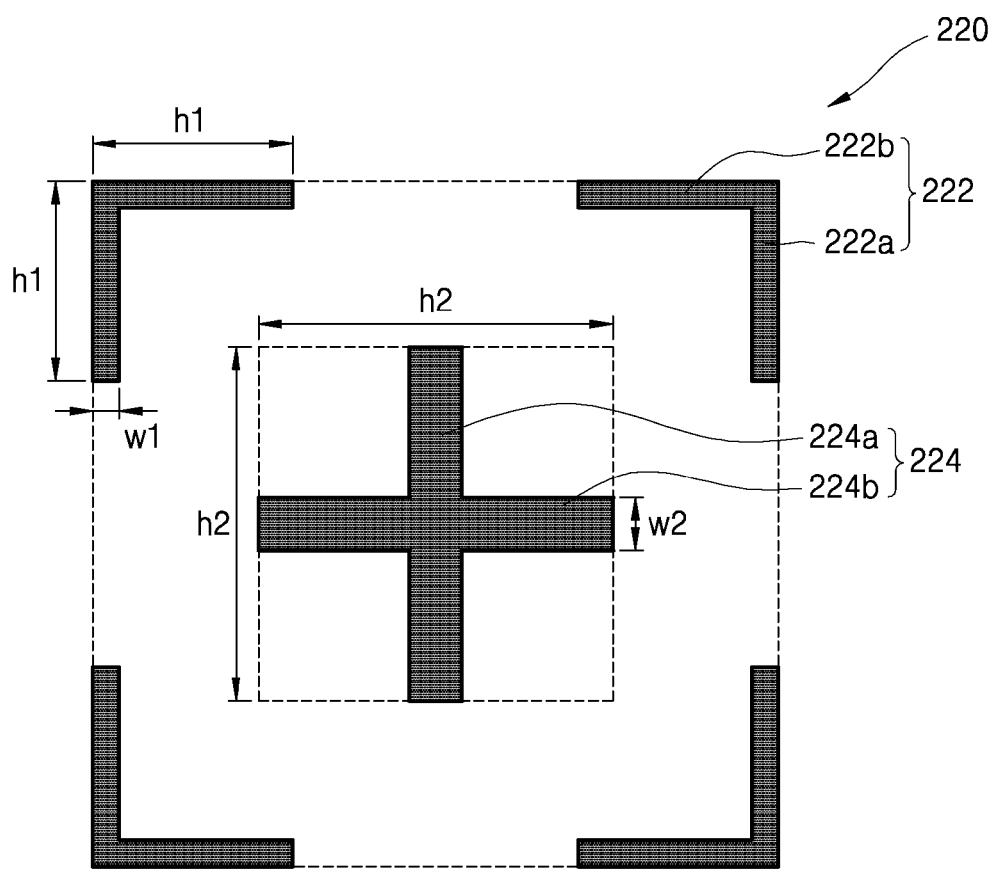
FIG. 8 is a diagram illustrating a resonant unit arranged in a broadband infrared detector according to an example embodiment.

FIG. 8 is a diagram illustrating a resonant unit 220 arranged in a broadband infrared detector according to another example embodiment.

As illustrated in FIG. 8, the resonant unit 220 may include four first resonators 222 and a second resonator 224. Each of the four first resonators 222 may include a first sub-resonator 222a and a second sub-resonator 222b that share a corner region. The second resonator 224 may include a third sub-resonator 224a and a fourth sub-resonator 224b that share a center region. The four first resonators 222 may be respectively arranged on the corner regions of the thermistor layer 130, and the second resonator 224 may be arranged on the center region of the thermistor layer 130. Accordingly, the four first resonators 222 may absorb the infrared light of the first wavelength band, and the second resonator 224 may absorb the infrared light of the second wavelength band.

Figure 9:
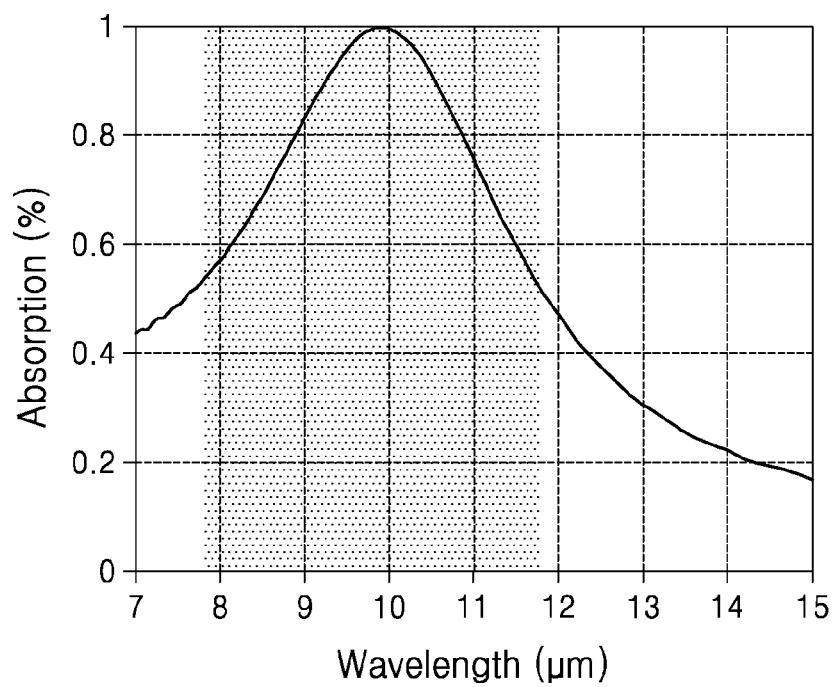
FIG. 9 is a graph illustrating a result of simulating an absorption spectrum of the resonant unit illustrated in FIG. 7A.
Figure 10:
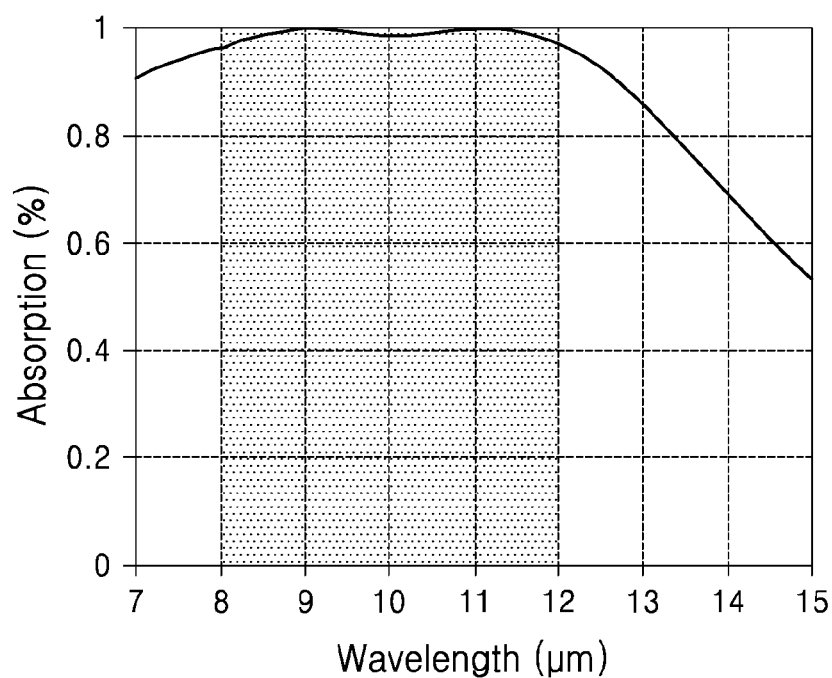
FIG. 10 is a graph illustrating a result of simulating an absorption spectrum of the resonant unit illustrated in FIGS. 8.

FIGS. 9 and 10 are graphs illustrating results of simulating an absorption spectrum of the resonant unit illustrated in FIGS. 7A and 8, respectively.

The first resonator 222 is designed to have a length of about 2.2 $\lambda$m and a width of about 0.5 $\lambda$m, and the second resonator 224 is designed to have a length of about 3.2 $\lambda$m and a width of about 0.5 $\lambda$m.

As illustrated in FIG. 9, when the resonant unit resonates at a single wavelength, a band of an absorption spectrum in which an absorption ratio is about 90% or higher is about 9.5 $\lambda$m to about 10.5 $\lambda$m.

However, as illustrated in FIG. 10, when the resonant unit resonates at a plurality of wavelengths, a band of an absorption spectrum in which an absorption ratio is about 90% or higher is about 8 $\lambda$m to about 12 $\lambda$m. Therefore, it may be understood that the bandwidth of the absorption spectrum is wider in the case of the resonant unit resonating at multiple wavelengths. It may also be understood that an average absorption ratio is about 70% or higher.

Figure 11:
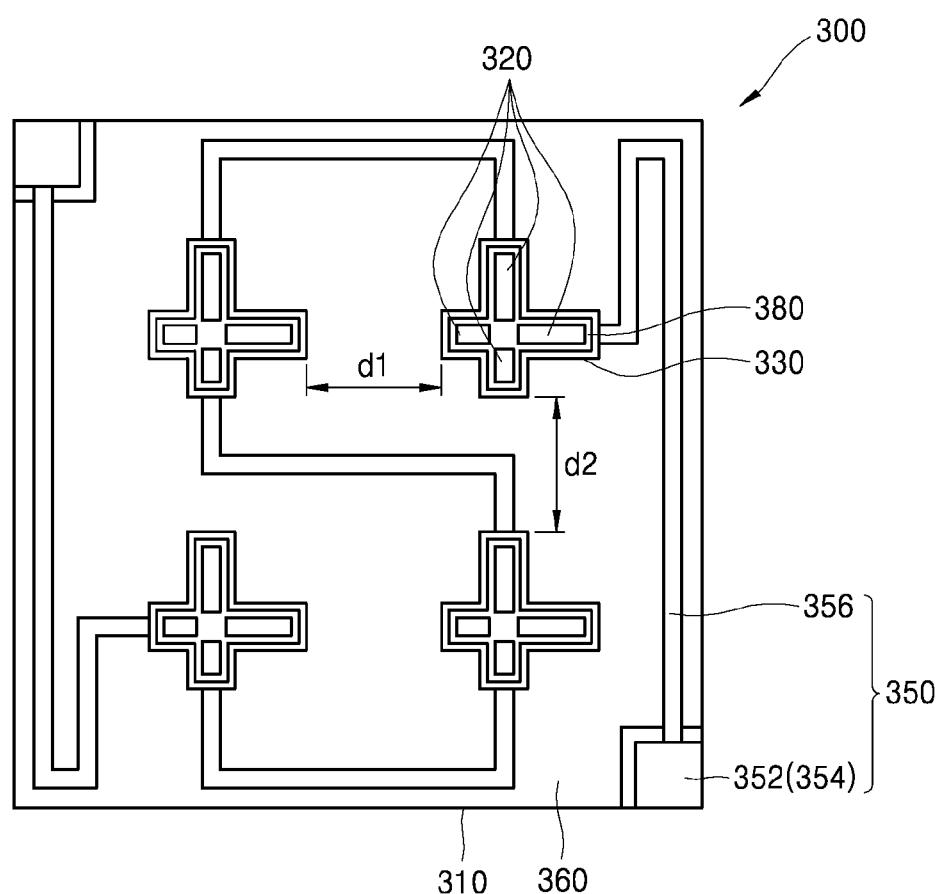
FIG. 11 is a planar view illustrating an infrared detector according to another example embodiment.

FIG. 11 is a planar view illustrating an infrared detector according to another example embodiment.

In FIG. 1, the infrared detector 100 includes a single resonant unit 120. However, as illustrated in FIG. 11, an infrared detector 300 may include a plurality of resonant units 320.

More specifically, as illustrated in FIG. 11, the infrared detector 300 may include a substrate 310; the plurality of resonant units 320 spaced apart from the substrate 310 to absorb infrared light and generate heat; a plurality of thermistor layers 330 for converting the heat from the plurality of resonant units 320 to electrical signals; a connection unit 350 that supports the plurality of thermistor layers 330 so that the thermistor layers 330 are spaced apart from the substrate 310, and electrically connects the plurality of thermistor layers 330 to the substrate 310; and a thermal separation layer 360 disposed between the substrate 310 and the thermistor layers 330 to block heat transfer to the substrate 310.

In FIG. 11, four resonant units 320 are illustrated, but the number of resonant units 320 is not limited thereto. The number of resonant units 320 may be different according to a design purpose of the infrared detector 300. Each of the plurality of thermistor layers 330 may support one of the resonant units 320. The thermistor layer 330 may have a shape patterned according to the shape of the resonant unit 320 in order to minimize thermal mass.

The connection unit 350 may include a pair of supports 352/354 protruding from the substrate 310 so that the plurality of thermistor layers 330 are spaced apart from the substrate 310; and a plurality of thermal legs 356 for connecting the plurality of thermistor layers 330 to the pair of supports 352/354. The plurality of thermal legs 356 may be connected in series. Each of the plurality of resonant units 320 may include a first resonator for absorbing first infrared light of a first wavelength band and a second resonator for absorbing second infrared light of a second wavelength band. Each of the first and second resonators may include a first sub-resonator for absorbing first polarized light and a second sub-resonator for absorbing second polarized light perpendicular to the first polarized light.

In the case where the plurality of thermistor layers 330 and the plurality of resonant units 320 are arranged, a distance between adjacent thermistor layers 330 may be appropriately adjusted to reduce diffraction loss. Distances d1 and d2 between the thermistor layers 330 act as diffraction slits. Therefore, if infrared light of a wavelength band to be detected diffracts between the distances, the efficiency of the infrared defector 300 may degrade. Therefore, by setting the distances d1 and d2 to be smaller than the wavelength of the infrared band to be detected, the infrared light incident to the infrared detector 300 may not diffract at the distances between the thermistor layers 330. For example, the distances d1 and d2 between the thermistor layers 330 may be smaller than about 8 μm, in one or more example embodiments, the distances d1 and d2 may be about 6 μm.

The infrared detector 300 of FIG. 11 is the same as the above-described infrared detector 100 except that the resonant units 320 and the thermistor layers 330 are provided in plurality and the thermistor layers 330 are connected by the thermal legs 356. Therefore, detailed descriptions of the infrared detector 300 are omitted.

The infrared detectors according to example embodiments can resonate at multiple wavelength bands, and thus the infrared detector can absorb broadband infrared light and also have improved stability due to the thermal separation layer.

The above-described infrared detectors can be used in infrared thermal imaging cameras having a two-dimensional array of a plurality of unit pixels, or in infrared sensors or thermal imaging sensors having a structure of a single unit pixel.

It should be understood that the example embodiments described therein should be considered in a descriptive sense only and not for purposes of limitation. Descriptions of features or aspects within each embodiment should typically be considered as available for other similar features or aspects in other example embodiments.

What is claimed is:

1. An infrared detector comprising:
    a substrate;
    a resonant unit spaced apart from the substrate, the resonant unit configured to generate heat by inducing resonance at a plurality of wavelengths of incident infrared light, the resonant unit including first and second resonators having different resonant frequencies;
    a thermistor layer configured to support the resonant unit and be spaced apart from the resonant unit such that the thermistor layer supports the first and second resonators and the heat generated from the first and second resonators varies a resistance value of the thermistor layer; and
    a connection unit configured to,
        support the thermistor layer such that the thermistor layer is spaced apart from the substrate, and
        electrically connect the thermistor layer to the substrate.

2. The infrared detector of claim 1, wherein
    the first resonator is configured to absorb infrared light of a first wavelength band; and
    the second resonator is configured to absorb infrared light of a second wavelength band, the second wavelength band containing at least a wavelength that is outside of the first wavelength band.

3. The infrared detector of claim 1, wherein at least one of the first and second resonators comprises:
    a first sub-resonator configured to absorb first polarized light; and
    a second sub-resonator configured to absorb second polarized light, the second polarized light being perpendicular to the first polarized light.

4. The infrared detector of claim 3, wherein at least one of the first and second sub-resonators has a shape of a rod.

5. The infrared detector of claim 3, wherein the first and second sub-resonators are either spaced apart from each other or share a region.

6. The infrared detector of claim 3, wherein the first sub-resonator of the first resonator and the second sub-resonator of the second resonator share a region.

7. The infrared detector of claim 2, wherein the first and second resonators are either spaced apart from each other or share a region.

8. The infrared detector of claim 2, wherein the first wavelength band and the second wavelength band partially overlap with each other or are completely different from each other.

9. The infrared detector of claim 1, wherein the connection unit comprises:
    a support protruding from the substrate, the support configured to space the thermistor layer apart from the substrate; and
    a thermal leg configured to connect the thermistor layer to the support.

10. The infrared detector of claim 9, wherein the thermal leg forms a meander pattern.

11. The infrared detector of claim 9, further comprising:
    a metal pad disposed between the support and the substrate, the metal pad configured to electrically connect the support to the substrate.

12. The infrared detector of claim 1, further comprising:
    a reflective layer disposed between the substrate and the thermistor layer, the reflective layer configured to reflect incident infrared light.

13. The infrared detector of claim 12, wherein the reflective layer is configured to contact the substrate.

14. The infrared detector of claim 12, wherein the reflective layer is formed of metal material, the metal material forming the reflective layer being configured to absorb less heat than a material of the resonator.

15. The infrared detector of claim 1, further comprising:
    a thermal separation layer disposed between the substrate and the thermistor layer, the thermal separation layer configured to block heat transfer from the thermistor layer to the substrate.

16. An infrared detector comprising:
    a substrate;
    a plurality of resonant units spaced apart from the substrate, the plurality of resonant units configured to, generate heat by inducing resonance at a plurality of resonant wavelengths, and absorb infrared light, each of the plurality of resonant units including first and second resonators having different resonant frequencies;
    a plurality of thermistor layers configured to support the resonant units such that each of the plurality of thermistor layers supports the first and second resonators in associated one of the resonant units and the heat generated from the first and second resonators varies a resistance value of the associated thermistor layer; and
    a connection unit configured to,
        support the plurality of thermistor layers such that the plurality of thermistor layers are spaced apart from the substrate, and
        electrically connect the plurality of thermistor layers to the substrate.

17. The infrared detector of claim 16, wherein the connection unit comprises:
- a plurality of supports protruding from the substrate, the supports configured to space the plurality of thermistor layers apart from the substrate; and
- a plurality of thermal legs configured to connect the plurality of thermistor layers to the supports.

18. The infrared detector of claim 17, wherein the thermal legs are connected each other in series.

19. The infrared detector of claim 16, wherein
the first resonator is configured to absorb infrared light of a first wavelength band; and
the second resonator is configured to absorb infrared light of a second wavelength band, the second wavelength band containing at least a wavelength that is outside of the first wavelength band.

20. The infrared detector of claim 19, wherein at least one of the first and second resonators comprises:
- a first sub-resonator configured to absorb first polarized light; and
- a second sub-resonator configured to absorb second polarized light, the second polarized light being perpendicular to the first polarized light.

21. An infrared detector comprising:
- a resonator having first and second resonators each having a discrete resonant frequency such that the resonator is configured to generate heat in response to electromagnetic radiation within at least two distinct wavelength bands; and
- a thermistor disposed below the resonator at a distance such that the thermistor is below the first and second resonators and the heat generated from the first and second resonators varies a resistance value of the thermistor.

22. The infrared detector of claim 21, wherein the resonator is configured to generate the heat in response to electromagnetic radiation within a first wavelength band and a second wavelength band, the second wavelength band including wavelengths outside of the first wavelength band.

23. The infrared detector of claim 21 wherein one or more of the first and second resonators comprises:
- a plurality of sub-resonators, each sub-resonator having one of the discrete resonant frequencies.

24. The infrared detector of claim 21, wherein the wavelengths of the first and second wavelength bands both include wavelengths of infrared light.

* * * * *